US010960713B2

(12) United States Patent
Billy et al.

(10) Patent No.: US 10,960,713 B2
(45) Date of Patent: Mar. 30, 2021

(54) METHOD FOR DETECTING AND ESTIMATING AN ANGLE OF ROTATION ON ITSELF OF A WHEEL UNIT WITH AN INTEGRATED RADIAL ACCELERATION SENSOR

(71) Applicants: Continental Automotive France, Toulouse (FR); Continental Automotive GmbH, Hannover (DE)

(72) Inventors: Stéphane Billy, Grenade (FR); Jean-Christophe Bouthinon, Cugnaux (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 296 days.

(21) Appl. No.: 16/310,073

(22) PCT Filed: Jun. 16, 2017

(86) PCT No.: PCT/FR2017/051573
§ 371 (c)(1),
(2) Date: Dec. 14, 2018

(87) PCT Pub. No.: WO2017/216496
PCT Pub. Date: Dec. 21, 2017

(65) Prior Publication Data
US 2019/0241031 A1 Aug. 8, 2019

(30) Foreign Application Priority Data

Jun. 17, 2016 (FR) ..................................... 1655644

(51) Int. Cl.
*B60B 37/10* (2006.01)
*G01P 3/44* (2006.01)
*B60C 23/04* (2006.01)

(52) U.S. Cl.
CPC .......... *B60C 23/0488* (2013.01); *B60B 37/10* (2013.01); *G01P 3/44* (2013.01)

(58) Field of Classification Search
None
See application file for complete search history.

(56) References Cited

U.S. PATENT DOCUMENTS 6,466,887 B1 * 10/2002 Weinbrenner ......... G01C 21/26
701/1
8,576,121 B2 * 11/2013 Guinart ............... B60C 23/0416
342/442

(Continued)

FOREIGN PATENT DOCUMENTS

CN 104066601 A 9/2014
CN 104108607 A 10/2014

(Continued)

OTHER PUBLICATIONS

International Search Report and Written Opinion for International Application No. PCT/FR2017/051573, dated Aug. 29, 2017—7 pages.

(Continued)

*Primary Examiner* — Peter J Macchiarolo
*Assistant Examiner* — Jermaine L Jenkins
(74) *Attorney, Agent, or Firm* — RatnerPrestia

(57) ABSTRACT

A method for detecting and estimating an angle of rotation on itself, about a mounting axis, of a wheel unit with an acceleration sensor, the wheel unit being associated with a tire mounted on a rim, forming a wheel, the sensor detecting a gravitational force during the rotation of the wheel, forming a sinusoid. The wheel unit is mounted on the wheel with the acceleration sensor directly or indirectly inclined with respect to a plane tangential to the rim. The angle of rotation on itself of said wheel unit and therefore of the acceleration sensor at a given instant is estimated by comparing at least (Continued)

one parameter of the sinusoids that are obtained for the wheel unit in an initial mounting position on the wheel and in its position at this given instant, respectively.

13 Claims, 4 Drawing Sheets

(56) References Cited

U.S. PATENT DOCUMENTS

| | | | | |
|---|---|---|---|---|
| 8,593,273 | B2* | 11/2013 | Gotschlich | B60C 23/0488 |
| | | | | 340/445 |
| 8,700,286 | B2* | 4/2014 | Steiner | B60C 23/00 |
| | | | | 701/71 |
| 8,751,190 | B2* | 6/2014 | Geisler | G01P 3/22 |
| | | | | 702/145 |
| 8,843,267 | B2* | 9/2014 | Park | B60C 23/0416 |
| | | | | 701/34.4 |
| 9,186,938 | B2* | 11/2015 | Okada | B60C 23/0408 |
| 9,211,879 | B2* | 12/2015 | Leitel | B61L 25/021 |
| 9,459,275 | B2* | 10/2016 | Guinart | B60C 23/0489 |
| 9,891,045 | B2* | 2/2018 | Vassilieff | B60C 23/0494 |
| 2006/0161327 | A1 | 7/2006 | Emmerich et al. | |
| 2012/0116607 | A1 | 5/2012 | Guinart | |
| 2014/0371980 | A1 | 12/2014 | Sekizawa et al. | |
| 2015/0183279 | A1 | 7/2015 | Okada et al. | |

FOREIGN PATENT DOCUMENTS

| | | |
|---|---|---|
| CN | 104417294 A | 3/2015 |
| DE | 102004042191 B3 | 2/2006 |
| DE | 102005002240 A1 | 7/2006 |
| WO | 2011006619 A2 | 1/2011 |

OTHER PUBLICATIONS

Chinese Office Action for Chinese Application No. 201780050226.4, dated Apr. 3, 2020, with translation, 8 pages.

* cited by examiner

METHOD FOR DETECTING AND ESTIMATING AN ANGLE OF ROTATION ON ITSELF OF A WHEEL UNIT WITH AN INTEGRATED RADIAL ACCELERATION SENSOR

CROSS REFERENCE TO RELATED APPLICATIONS

This application is the U.S. National Phase Application of PCT International Application No. PCT/FR2017/051573, filed Jun. 16, 2017, which claims priority to French Patent Application No. 1655644, filed Jun. 17, 2016, the contents of such applications being incorporated by reference herein.

FIELD OF THE INVENTION

The present invention pertains to the automotive sector. More precisely, the invention relates to a method for detecting and estimating an angle of rotation on itself, about a mounting axis, of a wheel unit for measuring operating parameters of a tire with a radial acceleration sensor integrated into said wheel unit.

BACKGROUND OF THE INVENTION

With the tire being mounted on a rim, forming, with the rim, a vehicle wheel that is able to rotate about a rolling axis, the wheel unit is mounted in the wheel, incorporating an acceleration sensor. The acceleration sensor detects a gravitational force when the wheel rotates, forming a sinusoid.

In FIG. 1, the dashed curve shows a sinusoid S0 whose period makes it possible to compute the rotational speed of the wheel associated with the acceleration sensor, this rotational speed of the wheel being a function of the diameter of the wheel and of the period of the sinusoid. The sinusoid S0 varies between a maximum positive amplitude +Gr and a maximum negative amplitude −Gr.

At point A, the acceleration sensor detects a gravitational force at +Gr, this being the point of maximum amplitude of the sinusoid S0. At point C, the gravitational force detected is at 0, the acceleration sensor being perpendicular to this force. Point E corresponds to the maximum negative amplitude of the sinusoid −Gr, the sensor detecting a negative gravitational force. Point G corresponds to a gravitational force at 0, the sensor being perpendicular to this force, and therefore to a passage of the sinusoid S0 via its x-axis. The period of the sinusoid S0 will be the image of the rotational speed dependent on the diameter of the wheel.

It is known that the measurements of operating parameters of a wheel of a motor vehicle are performed by sensors mounted in electronic modules, called electronic units for measuring operating parameters of a wheel tire or wheel units. These sensors may be a pressure sensor in a tire for a wheel and/or a radial acceleration sensor making it possible to determine the rotational speed of the wheel. Hereinafter, the term "wheel unit" will be used to denote such an element.

As is known, wheel units generally include a microprocessor, a memory, a radiofrequency transmitter, a power supply battery and at least one radial acceleration sensor able to measure the radial accelerations of the wheel, this radial acceleration sensor being mounted on a support forming a printed circuit board. The radial acceleration measurements are sent via radiofrequency by a radio wave transmission device, often associated with the acceleration sensor, to a central system for monitoring the operating parameters of each wheel and in particular its rotational speed, called a wheel central control unit. This radio wave transmission device has antennas that are oriented precisely toward the wheel central control unit so as to optimize the transmissions.

It is possible to synchronize, with the sinusoid, shown in FIG. 1, the transmission of a radio frame by the wheel unit to the wheel central control unit via transmission dials.

To transmit information to the wheel central control unit, the wheel unit transmits periodic radio frames. The quality of reception of the radio frames is linked directly to the position of the wheel unit, a change in position of the wheel unit being able to vary the orientation of the radiofrequency antennas and therefore worsen the radio link between the wheel unit and a central radiofrequency reception unit.

During the lifetime of the wheel unit, the wheel unit may rotate on itself in an unwanted manner about an axis, which is its mounting axis, for example, in some nonlimiting configuration forms, an axis radial to the wheel, by a small angle of rotation. This rotation of the wheel unit will be called rotation of the wheel unit on itself in the following text. The effect of the rotation of the wheel unit on itself worsens radiofrequency performance.

The use of radial acceleration sensors, as are integrated into a wheel unit, does not allow the detection of the incorrect position of this wheel unit for radiofrequency transmissions.

Independently of this, in some mounting configurations of the wheel unit, the wheel unit is mounted on the rim such that its acceleration sensor extends tangential and parallel to the rolling axis of the wheel. In other mounting configurations, the wheel unit is mounted on the rim such that its sensor is positioned perpendicular to the plane of the rim of the wheel, or the wheel unit may also be mounted on the sidewall of the tire or of the rim.

This means that each mounting configuration requires a specific arrangement of the radial acceleration sensor, in particular with respect to its support. Specifically, in the first mode of integration, the radial acceleration sensor is mounted parallel to its support, whereas, in the second mode of integration, the radial acceleration sensor is mounted perpendicular to the support. This means having to design two different types of wheel unit for the mounting configurations.

SUMMARY OF THE INVENTION

The problem addressed by an aspect of the present invention is that of detecting and estimating an angle of unwanted rotation on itself of a wheel unit for measuring operating parameters of a tire with a radial acceleration sensor integrated into said wheel unit.

Another problem addressed by an aspect of the present invention is that of monitoring the transmission power of radio waves by the wheel unit as a function of the angle of rotation on itself of the wheel unit, possibly by compensating the variation in the transmission power due to the angle of rotation on itself of the wheel unit.

To this end, an aspect of the present invention relates to a method for detecting and estimating an angle of rotation on itself, about its mounting axis, of a wheel unit for measuring operating parameters of a tire with a radial acceleration sensor integrated into said wheel unit, the tire being mounted on a rim, forming, with the rim, a vehicle wheel able to rotate about a rolling axis, the sensor detecting a gravitational force during the rotation of the wheel, forming a sinusoid as a function of time, the rotational speed of the wheel being a function of the diameter of the wheel and of the period of the sinusoid, noteworthy in that the wheel unit is mounted on the wheel with the acceleration sensor directly or indirectly inclined with respect to a plane tangential to the rim, and in that the angle of rotation on itself of said wheel unit and therefore of said acceleration sensor at a given instant is estimated by comparing at least one parameter of the sinusoids that are obtained for the wheel unit in an initial mounting position on the wheel and in its position at this given instant, respectively.

An aspect of the invention makes it possible to detect the unwanted rotation of a wheel unit on itself, to indicate this to the wheel unit itself or to a wheel central control unit of the vehicle and, possibly, to compensate the transmission power in order to guarantee a sufficient radio link budget for the system still to be operational.

The rotation on itself of the wheel unit is detected with respect to its initial mounting position, which is the optimum estimated position for the radio wave transmission, the antennas of a wave transmission device integrated into the wheel unit being able to point in this position toward the radio wave reception unit, in particular toward the wheel central control unit.

Advantageously, said at least one parameter of the sinusoids for estimating the angle of rotation on itself of said wheel unit is a difference in amplitude of the sinusoids or a phase offset between the sinusoids in the initial position and at a given instant.

A first embodiment of the method makes it possible to detect this rotation of the wheel unit on itself about its mounting axis. If the acceleration sensor starts to rotate about its mounting axis and, by virtue of the position of the sensor with an incline with respect to a plane tangential to the rim, preferably by an angle of 45°, there will be a direct relationship between the amplitude of the measurement of the gravitational force and the angle of rotation of this module.

If the wheel unit starts to rotate on itself, an angular offset will take effect. This phase offset may be compared with the angular measurement performed by a computer external to the wheel unit. If the firing of a radio frame is phase-offset with respect to what is expected, that is to say the initial firing angle, the wheel unit will necessarily have rotated.

Advantageously, said at least one parameter of the sinusoids for estimating the angle of rotation on itself of said wheel unit is a difference in amplitude of the sinusoids and a phase offset between the sinusoids in the initial position and at a given instant. The two embodiments of the method are then combined for greater accuracy in the estimation of the angle of rotation of the wheel unit about its mounting axis.

Advantageously, when said at least one parameter is at least one difference in amplitude of the sinusoids, there is estimation of a maximum amplitude at an angle of rotation $\varphi$ on itself of said wheel unit as a function of a nominal maximum amplitude Grnom in the initial position, using the following formula:

$Gr=Gr\text{nom}\cdot\cos(\varphi/2)$ for $\varphi$ between [0 and 90°] and [180° and 270°]

$Gr=Gr\text{nom}\cdot\sin(\varphi/2)$ for $\varphi$ between [90 and 180°] and [270° and 360°].

Advantageously, when said at least one parameter is at least one phase offset of the sinusoids, the acceleration sensor transmitting radio waves toward the outside of the wheel unit at a predetermined angle of rotation of the wheel for the transmission, the actual angle of rotation of the wheel at the instant of the transmission moreover being measured, if this predetermined angle of rotation for the transmission does not correspond to the actual angle of rotation of the wheel at the instant of the transmission, there is deduced from this a rotation on itself of the wheel unit by an angle that is the difference between the predetermined angle of rotation for the transmission and the actual angle of rotation of the wheel at the instant of the transmission.

An aspect of the invention relates to a method for monitoring and compensating a transmission power of radio waves from an acceleration sensor of a wheel unit, noteworthy in that there is estimation of an angle of rotation on itself of the wheel unit in accordance with such a detection and estimation method and a range of firing angles considered to allow a transmission of radio waves with an acceptable power and, when this angle of rotation corresponds to a firing angle that is not within the predetermined range of firing angles, a diagnosis of unacceptable transmission power is transmitted.

The method according to an aspect of the present invention is effective when moving. This range of firing angles is determined through experience, being for example between −30 and +30° about the initial position of the wheel unit, this not being limiting.

Advantageously, there is compensation of the radio wave transmission power as a function of a predetermined table that is specific for each type of wheel unit.

An aspect of the invention relates lastly to a wheel unit for measuring operating parameters of a tire, said tire being mounted on a rim, the tire and the rim forming a vehicle wheel able to rotate about a rolling axis, the wheel unit comprising a support designed to be mounted on the wheel and bearing a radial acceleration sensor able to measure radial accelerations of the wheel, the radial acceleration sensor including a device for transmitting radio waves toward the outside of the wheel unit, noteworthy in that the radial acceleration sensor is mounted directly or indirectly inclined within an angular range with respect to a plane tangential to the rim or to the tire and in that the unit comprises elements for comparing at least one parameter of the sinusoids that are obtained for a wheel unit in an initial mounting position on the wheel and in a position at a given instant, respectively, and elements for estimating an angle of rotation on itself of the wheel unit in order to implement such a detection and estimation method.

Such a wheel unit may be applied on the mounting plane of the rim, the inner surface of the tread of the tire, an inflation valve of the tire inside the tire or on a sidewall of the tire.

Advantageously, the wheel unit comprises elements for computing a difference between the amplitudes of the sinusoids in the initial position and at a given instant and means for diagnosing when the difference between the amplitudes is not within a predetermined range of firing angles stored in the wheel unit.

An aspect of the invention also relates to an assembly of a wheel central control unit, of a wheel anti-lock system and of wheels of a motor vehicle, each wheel comprising such a wheel unit, the wheel anti-lock system comprising an angle coder able to measure the actual rotation of each wheel at a given instant and means for transmitting the measurements of the actual rotation of each wheel to the wheel central control unit, the transmission device of the wheel unit of each wheel transmitting radio waves to the wheel central control unit at a transmission angle of rotation of the wheel stored in the wheel central control unit, noteworthy in that the wheel central control unit has firstly elements for comparing the measurement of actual rotation of each wheel at the instant of transmission detected by the angle coder and the stored transmission angle of rotation, and secondly means for diagnosing an unacceptable modification of the transmission power of the transmission device of the wheel unit when the difference between the measurement of actual rotation at the instant of transmission and the stored transmission angle of rotation is not within a predetermined range of firing angles stored in the wheel central control unit.

BRIEF DESCRIPTION OF THE DRAWINGS

Other features, aims and advantages of aspects of the present invention will become apparent upon reading the detailed description that will follow and upon examining the appended drawings, given by way of nonlimiting example and in which.

DETAILED DESCRIPTION OF THE PREFERRED EMBODIMENTS

Figure 2:
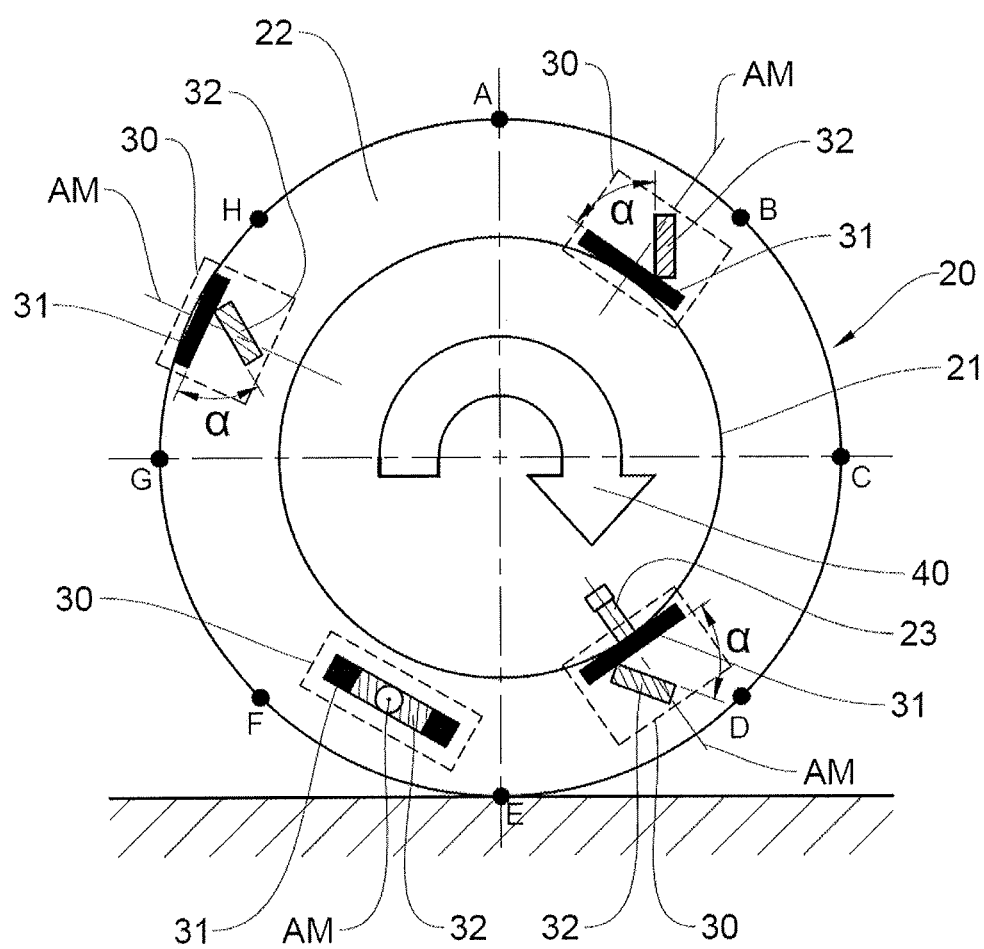
FIG. 2 shows four embodiments of a wheel unit with an acceleration sensor inclined at 45° with respect to the tangential plane of the rim of the wheel, this showing an optimum but nonlimiting case, such embodiments of sensors according to FIG. 2 being able to be used to implement the method for detecting and estimating an angle of rotation on itself of a wheel unit according to an aspect of the present invention.

With reference to all of the figures taken in combination, and in particular to FIG. 2, an aspect of the present invention relates to a method for detecting and estimating an angle of rotation on itself, about its mounting axis AM, of a wheel unit 30 for measuring operating parameters of a tire 22 with a radial acceleration sensor 32 integrated into said wheel unit 30.

FIG. 2 simultaneously shows four wheel units 30 in various respective positions, but it is readily understood that, in general, there is just one wheel unit 30 per tire 22. The mounting axis AM for three of these wheel units 30 is shown extending radially to the wheel 20, but the mounting axis AM may very well extend to another position with respect to the wheel 20, for example transverse to the tire 22 or in another direction. Points A, B, C, D, E, F, G, H on the perimeter of the wheel 20 are the same as those referenced in FIG. 1, each indicating a position of rotation of the wheel 20.

As is conventional, the tire 22 is mounted on a rim 21, forming, with the rim 21, a vehicle wheel 20 that is able to rotate about a rolling axis, the wheel 20 rotating along the arrow 40. As shown in FIG. 2, each wheel unit 30 includes an acceleration sensor 32 mounted on a support 31.

It is proposed to mount the radial acceleration sensor directly or indirectly inclined with respect to a plane tangential to the rim or to the tire, this possibly making it possible, in particular when the angle of incline is 45°, to use the same position of the sensor for both mounting configurations mentioned above. A direct incline is obtained by inclining the acceleration sensor with respect to its support, whereas an indirect incline is obtained by inclining the support with a sensor that is not inclined with respect to its support.

It should be kept in mind that such an incline with respect to a tangential plane of the rim is not equivalent to a rotation of the acceleration sensor on itself induced by a rotation of the wheel unit on itself, this rotation taking place about the mounting axis AM of the wheel unit 30.

FIG. 2 shows four wheel units 30 for one and the same wheel, while just one could suffice. For the first and second of the four wheel units 30, which are fastened respectively against the rim 21, at the upper right-hand side of FIG. 2, or on the internal circular periphery of the tire 22 below its tread, at the upper left-hand side of FIG. 2, the radial acceleration sensor 32 is mounted in a first position inclined by an angle α of 45° with respect to the tangential plane of the rim 21. In these two cases, the mounting axis AM of the wheel unit 30 extends radially to the wheel 20 when only the radial acceleration sensor 32 is inclined and not its support 31.

The same applies to the third wheel unit 30 that forms part of an inflation valve 23 of the tire 22, shown at the lower right-hand side of FIG. 2. This is not the case for the fourth wheel unit 30 fastened to a sidewall of the tire 22, shown at the lower left-hand side of FIG. 2. An angle of incline of 45° is preferred but not limiting. It may be contemplated to have a relatively broad range for the angle of incline a, for example between 30 and 60°.

What is detected according to an aspect of the present invention is the rotation of a radio wave transmission device on itself about its mounting axis AM, which may change the orientation of the transmission antennas of this device and reduce the transmission power. However, as the radio wave transmission device may be joined to the radial acceleration sensor 32 integrated into the wheel unit 30 and therefore to the wheel unit 30 itself, the rotation of a wheel unit 30 on itself about its mounting axis AM will necessarily lead to the rotation of the radio wave transmission device and of the acceleration sensor 32.

Figure 1:
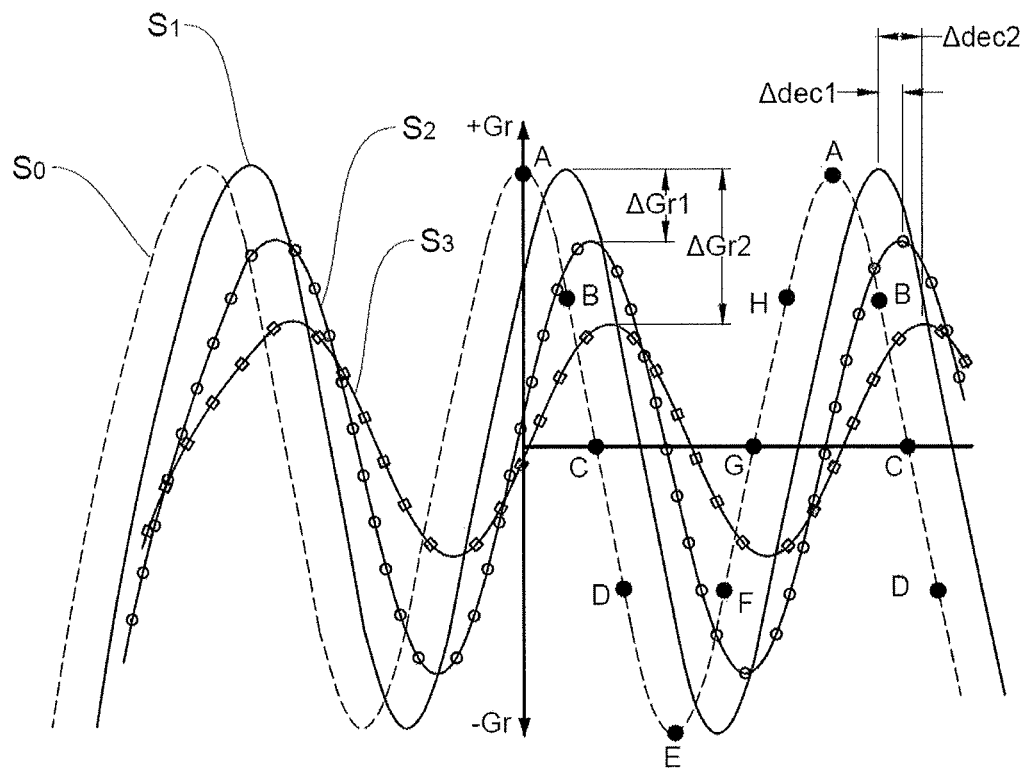
FIG. 1 illustrates four curves that may be followed by a respective acceleration sensor as a function of time, with a first sinusoid obtained with an acceleration sensor mounted in the plane tangential to the rim or to the tire of the associated wheel, the other three sinusoids being obtained with an acceleration sensor mounted inclined with respect to the plane tangential to the rim or to the tire, the second sinusoid being obtained for an acceleration sensor not having rotated on itself about its mounting axis, and the third and fourth sinusoids being obtained for an acceleration sensor having rotated on itself by two respective angles, the parameter under consideration for estimating the angle of rotation being the difference in amplitude between the three last sinusoids, the estimation then being carried out in accordance with a first embodiment of the method according to an aspect of the present invention, and/or the difference in phase offset between the three last sinusoids, the estimation then being carried out in accordance with a second embodiment of the method according to an aspect of the present invention.

With reference more particularly to FIGS. 1 and 2, the radial acceleration sensor 32 in the inclined position detects a gravitational force when the wheel 20 rotates, forming a sinusoid S1 to S3 as a function of time, the rotational speed of the wheel 20 being a function of the diameter of the wheel 20 and of the period of the sinusoid S1 to S3.

According to an aspect of the present invention, the angle of rotation on itself of said wheel unit 30 and therefore of said acceleration sensor 32 at a given instant is estimated by comparing at least one parameter ΔGr1, ΔGr2; Δdec1, Δdec2 of the sinusoids S1 to S3 that are obtained for the wheel unit 30 in an initial mounting position on the wheel 20 and in its position at this given instant, respectively.

This is shown in FIG. 1 for the three sinusoids S1 to S3 in an unbroken line, a sinusoid S0 in a dashed line corresponding to a sensor 32 that is not inclined with respect to the tangential plane of the rim 21 and that does not fall within the context of an aspect of the present invention.

The first sinusoid S1 in an unbroken line without a pattern is the sinusoid S1 obtained for an optimum position of a device for transmitting radio waves toward the outside of a wheel unit 30, in particular to the wheel central control unit of the motor vehicle. The maximum amplitude of the first sinusoid S1 is therefore the highest of the maximum amplitudes of the three sinusoids S1 to S3 in an unbroken line, corresponding to a sensor 32 that is inclined with respect to the tangential plane of the rim 21.

The other two sinusoids S2, S3 in an unbroken line, differentiated by circles and squares, respectively, are obtained during a respective rotation of the wheel unit 30 on itself. It is visible in FIG. 1 that the maximum amplitudes of these two sinusoids S2, S3 are lower than the maximum amplitude of the first sinusoid S1 in an unbroken line, these maximum amplitudes being compared with FIG. 1. Likewise, in FIG. 1, the sinusoids S2, S3 with circles or squares have phase offsets Δdec1, Δdec2 with the first sinusoid S1 in an unbroken line.

Thus, according to a first embodiment of an aspect of the invention, the parameter of the sinusoids S1 to S3 for estimating the angle of rotation on itself of said wheel unit 30 may be a difference in amplitude ΔGr1, ΔGr2 of the sinusoids S1 to S3, this for the two sinusoids S2, S3 corresponding to a wheel unit 30 that may have rotated on itself about its mounting axis AM with the sinusoid S1, called nominal sinusoid, relating to a wheel unit 30 in its initial fastening position on the wheel 30. There may preferably be a comparison of the maximum amplitudes, or two amplitudes corresponding respectively to the amplitude, at a given instant, of a unit that has rotated with the amplitude, at the same instant, of the theoretical sinusoid of a wheel unit in its initial position.

As an alternative, according to a second embodiment of an aspect of the invention, the parameter of the sinusoids S1 to S3 for estimating the angle of rotation may be a phase offset Δdec1, Δdec2 between the sinusoids S1 to S3 at the initial position and at a given instant. The difference in phase offset Δdec1, Δdec2 is established for each of the two sinusoids S2, S3 corresponding to a wheel unit 30 that may have rotated on itself about its mounting axis AM with respect to the nominal sinusoid S1 relating to a wheel unit 30 in its initial fastening position on the wheel 30.

It is possible to combine the two estimations, essentially for verification purposes. In this case, the parameters ΔGr1, ΔGr2; Δdec1, Δdec2 taken into consideration for estimating the angle of rotation on itself of said wheel unit 30 may be a difference in amplitude ΔGr1, ΔGr2 of the sinusoids, that is to say firstly the sinusoid S2 relating to a sensor that may have rotated with respect to the nominal sinusoid S1, and secondly the sinusoid S3 relating to a sensor that may have rotated with respect to the nominal sinusoid S1.

The same applies to a phase offset Δdec1, Δdec2 between the sinusoids S1 to S3 in the initial position and at a given instant, this still between a sinusoid S2, S3 relating to a sensor that may have rotated and the nominal sinusoid S1.

When the two estimations give different values and no estimation is deemed to be aberrant, there may be averaging of the two values in order to compute the angle of rotation on itself, about its mounting axis AM, of the wheel unit 30. The estimation of a rotation on itself of the wheel unit 30 by offset may prove more accurate, but requires a more complicated estimation process than for an estimation by comparing amplitudes.

When said at least one parameter is at least one difference in amplitude ΔGr1, £Gr2 of the sinusoids S1 to S3, there may be estimation of a maximum amplitude at an angle of rotation φ on itself of said wheel unit 30 as a function of a nominal maximum amplitude Grnom in the initial position, using the following formula:

$Gr = Grnom \cdot \cos(\varphi/2)$ for φ between [0 and 90°] and [180° and 270°]

$Gr = Grnom \cdot \sin(\varphi/2)$ for φ between [90 and 180°] and [270° and 360°].

Moreover, still for a parameter being at least one difference in amplitude ΔGr1, ΔGr2 of the sinusoids S1 to S3, there may be estimation of an amplitude Gr at an angle of rotation φ on itself of said wheel unit 30 at a given instant. Next, a sensor value VC may be defined, this reference VC being visible in FIG. 3, for a maximum amplitude of a sinusoid S1 to S3:

$VC = Gr \cdot \sin(\beta + \varphi/2 + \pi/4)$

β being the angle of rotation of the wheel 20 at this given instant.

For example, if the wheel unit 30 has rotated by 90° with respect to its nominal axis, the measured amplitude will be the nominal maximum amplitude Grnom divided by the square root of 2.

With continuing reference to FIGS. 1 and 2, according to the second embodiment of an aspect of the present invention, for which the parameter is at least one phase offset Δdec1, Δdec2 of the sinusoids S1 to S3, the acceleration sensor 32 transmits radio waves toward the outside of the wheel unit 30 at a predetermined angle of rotation of the wheel for the transmission. In addition, the actual angle of rotation of the wheel during the transmission is moreover measured, this advantageously being done by an angle coder able to measure the actual rotation of each wheel at a given instant, this angle coder being able to form part of a wheel anti-lock system, as will be described further on.

If this predetermined angle of rotation for the transmission does not correspond to the actual angle of rotation of the wheel during the transmission, there is deduced from this a rotation on itself of the wheel unit 30 by an angle that is the difference between the predetermined angle of rotation for the transmission and the actual angle of rotation of the wheel at the instant of the transmission.

The aim of such an estimation of angle of rotation of the wheel unit 30 on itself is to monitor and possibly to compensate the transmission power of a radiofrequency transmission device incorporated into the wheel unit 30 and preferably associated with the radial acceleration sensor 32.

An aspect of the present invention therefore also relates to a method for monitoring and compensating a radio wave transmission power from an acceleration sensor 32 of a wheel unit 30 for measuring operating parameters of a tire 22 such as mentioned above. An angle of rotation of the wheel unit 30 on itself corresponds to a firing angle of radio waves from the acceleration sensor 32, taken from an initial mounting reference angle of the wheel unit 30, which is the angle at which the transmission power is at a maximum.

The term "maximum" cannot be taken in its absolute sense. Specifically, it is possible for the effectively maximum transmission power to be obtained for a mechanically undesirable position. The expression "maximum power" should therefore be taken to be the maximum power that is technically possible and using pre-existing wheel units, given the mechanical limitations of the wheel unit or that the position of the wheel unit 30 has to comply with.

The radio wave transmission power may decrease as the wheel unit 30 rotates on itself, but the decrease in power is not a function of the angle of rotation on itself of the wheel unit 30.

For this monitoring and compensation method, an angle of rotation on itself of the wheel unit 30 is estimated in accordance with a detection and estimation method such as described above. A range of firing angles considered to allow transmission of radio waves with an acceptable power is also determined, this range of firing angles being able to be acquired through experience and being able to be calibrated.

When this angle of rotation corresponds to a firing angle that is not within the predetermined range of firing angles, a diagnosis of unacceptable transmission power is transmitted.

In addition, there may be compensation of the radio wave transmission power as a function of a predetermined table that is specific for each type of wheel unit 30 that is used. Specifically, there is not a mathematical function that gives the loss of transmission power as a function of the angle of rotation on itself of the wheel unit 30.

Figure 3:
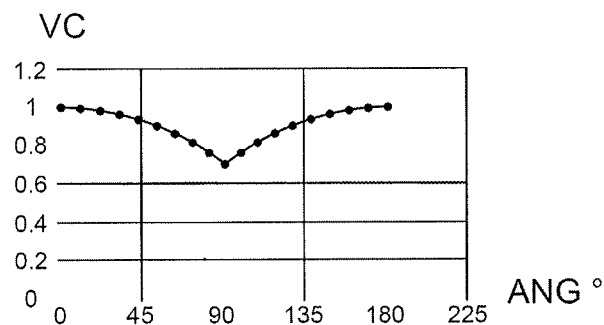
FIG. 3 shows the variation in amplitude of a sinusoid measured as a sensor value for various angles of rotation of the wheel unit on itself.

FIG. 3 shows the maximum amplitudes as a function of angles of rotation on itself of the wheel unit 30. The maximum amplitudes for each sinusoid S1 to S3 of FIG. 1 are taken, and the nominal maximum amplitude for the initial position of the wheel unit is brought to 1. For an angle of 0 or 180° rotation on itself of the wheel unit 30, the amplitude is at a maximum, whereas, for an angle of 90° rotation on itself of the wheel unit 30, the amplitude is at a minimum.

A range of angles of rotation on itself of the wheel unit 30 for which the transmission power of the radio wave transmission device associated with the radial acceleration sensor 32 does not need to be corrected may be estimated by experience. Without limitation, the angle range may be +/−30°, i.e. −30° to +30°, or 150° to 210°, starting from a point of maximum amplitude at 0° or 180°.

Figure 4:
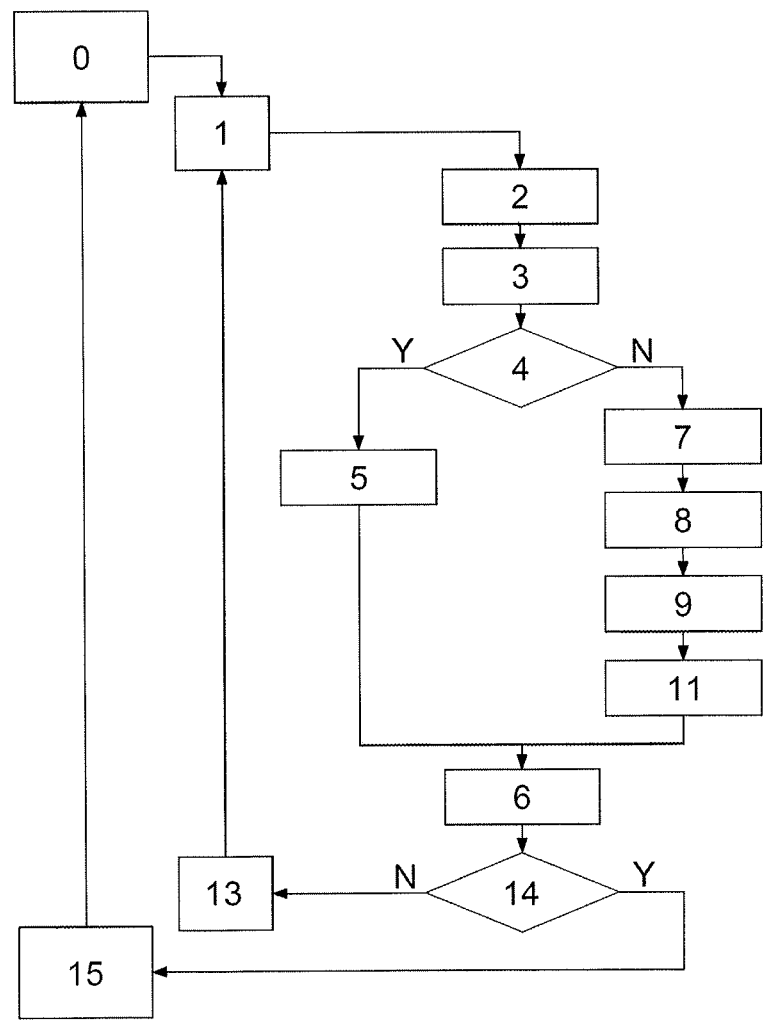
FIG. 4 shows a flow chart detailing the steps of the method according to the first embodiment of an aspect of the present invention.
Figure 5:
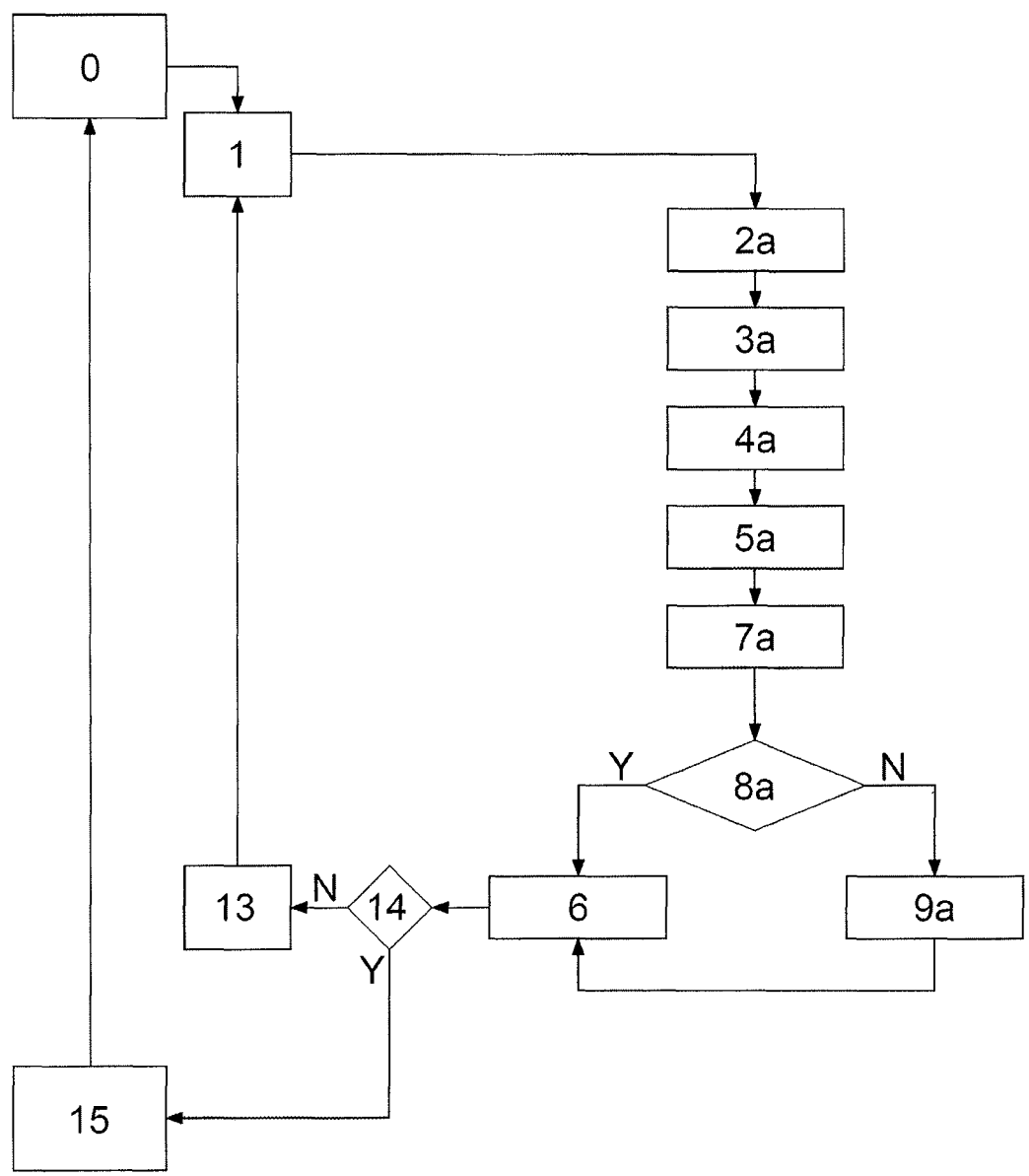
FIG. 5 shows a flow chart detailing the steps of the method according to the second embodiment of an aspect of the present invention.

FIGS. 4 and 5 illustrate a respective flow chart of one of the two embodiments of the detection method according to an aspect of the present invention, that is to say respectively with measurement of a difference in amplitude ΔGr1, ΔGr2 and measurement of a difference in phase offset Δdec1, Δdec2 of the sinusoids S1 to S3, as was seen in FIG. 1.

In FIG. 4, also all with reference to FIGS. 1 and 2 for the references that are not present in this FIG. 4, step 0 is the starting of the motor vehicle. Step 1 is the step of selecting a transmission mode. This step 1 of selecting a transmission mode may be implemented with a normal periodic transmission mode. In this case, upon each acceleration measurement, a comparison may be performed so as to identify whether the wheel unit has rotated on itself. As an alternative, this transmission step may be implemented with a rapid periodic transmission mode. This mode makes it possible to calibrate the system for future wheel unit position comparisons.

Step 2 is the step of putting into a mode for the estimation of an amplitude, by the radial acceleration sensor 32, of a sinusoid S1 to S3 for a position of the wheel unit 30 that may have rotated on itself with respect to the reference sinusoid S1 at the initial position of the wheel unit 30. Specifically, the transmission mode may then be a rapid periodic frame transmission mode, whereas the normal operation of the acceleration sensor did not require such a mode to be implemented.

Step 3 is the step of measuring the amplitude of a sinusoid S2 or S3 obtained at a given instant and of comparing with the nominal amplitude of the sinusoid S1 with the wheel unit 30 in its initial position, in order to ascertain whether or not the wheel unit 30 has rotated on itself.

Step 4 is the step of questioning to ascertain whether or not the detected amplitude is equal to the abovementioned nominal amplitude Grnom in the initial position of the wheel unit 30. The questioning may also relate to the fact that the detected amplitude, although it is lower than the nominal amplitude, it situated in an area close to this nominal amplitude, for example lower than this nominal amplitude by less than 5% to 10%, which could be tolerable. This is not limiting.

If the response to this questioning 4 is yes, which is symbolized by Y at one output of the questioning 4, therefore if the detected amplitude is equal to or slightly lower than the nominal amplitude, the position of the wheel unit 30 is defined as being correct and the radiofrequency power transmitted does not need to be corrected.

At step 5 the microprocessor of the wheel unit 30 stores this information, and this information may be sent via radiofrequency to the wheel central control unit of the motor vehicle. The acceleration sensor 32 then changes back to its usual detection mode, which is the one designed to detect the rotational speed of the wheel 20 in step 6 until the vehicle stops 15.

If the response to this questioning 4 is no, which is symbolized by N at one output of the questioning 4, therefore if the detected amplitude is notably lower than the nominal amplitude and the radio wave transmission power is unacceptably modified, most often by being reduced, step 7 estimates the angle of rotation on itself of the wheel unit 30 with respect to its initial position.

In step 8, a radiofrequency transmission power compensation for re-establishing an acceptable transmission power may be estimated. The radiofrequency transmission power compensation is performed through experience as a function of a predetermined table.

In step 9, the radio frame is modified.

In step 11, the microprocessor of the wheel unit 30 stores the information that the radiofrequency transmission power is incorrect, and this information may be sent via radiofrequency in the form of a diagnosis to the wheel central control unit of the motor vehicle. There is then questioning 14 to ascertain whether or not the vehicle may be stopped. If the response is yes, the vehicle is stopped 15. The acceleration sensor 32 then changes back to its usual detection mode, which is the one designed to monitor the rotational speed of the wheel 20 in step 6. If the response is no, 13 returns to the step of selecting the transmission mode 1.

In FIG. 5, also all with reference to FIGS. 1 and 2 for the references that are not present in this FIG. 5, step 0 illustrates the starting of a motor vehicle, and step 1 is the step of selecting the transmission mode, similar to that of FIG. 4, from a normal periodic transmission mode and a rapid periodic transmission mode.

Step 2a is the step of putting into a mode for the estimation of the phase offset of a sinusoid S2 or S3 for a position of the wheel unit 30 that may have rotated on itself with respect to the reference sinusoid S1 at the initial position of the wheel unit 30.

Step 3a is the coding of the firing angle in the radio frame, which firing angle will be compared with a firing angle measured outside the wheel unit 30, for example by an angle coder of a wheel anti-lock system, and step 4a is the sending of this frame to the wheel central control unit.

Step 5a is the step of measurement, by an element external to the wheel unit 30, of the actual angle of rotation of the wheel at the instant of sending of a radiofrequency transmission that has to occur at a transmission angle of rotation of the wheel, this external element being able to form part of a wheel anti-lock system. The measurement of the actual angle of rotation of the wheel is performed synchronously with the frame that is sent, so as to be effectively compared with the transmission angle of rotation of the wheel and see whether this angle has been modified.

Step 7a is the step of comparing the two angle of rotation measurements sent by the wheel unit 30 and the external element. This comparison is performed in the wheel central control unit.

Step 8a is the step of questioning to ascertain whether the difference in angle of rotation is zero. The questioning may also relate to the fact that the difference in angle of rotation is low, corresponding to a firing angle range that is able to guarantee an acceptable radiofrequency transmission power, for example a radiofrequency power lower by less than 5% to 10% of the maximum power in the initial position of the wheel unit 30. This is not limiting.

If the response to this questioning 8a is yes, which is symbolized by Y at one output of the questioning 8a, the position of the wheel unit 30 is defined as being correct and the power transmitted does not need to be compensated. The acceleration sensor 32 then changes back to its usual detection mode, which is the one of monitoring the rotational speed of the wheel 20 in the step 6 in FIG. 5.

After step 6, there is then questioning 14 to ascertain whether or not the vehicle may be stopped. If the response is yes, the vehicle is stopped 15. The acceleration sensor 32 then changes back to its usual detection mode, which is the one designed to monitor the rotational speed of the wheel 20 in step 6. If the response is no, 13 returns to the step of selecting the transmission mode 1.

It should be kept in mind that, in the method according to an aspect of the invention, it is not necessarily sought to correct the power as a function of the angle of rotation of the wheel unit 30 on itself. In the minimum case, it is simply sought to inform the system that the wheel unit 30 is in an unsuitable position. In the case of correcting the power, this system would require a bidirectional link, thereby making the system more complex, but which is entirely feasible.

If the response to this questioning 8a is no, which is symbolized by N at one output of the questioning 8a, therefore if the firing angle has been greatly offset and the radio wave transmission power of the transmission system inside the wheel unit 30 is reduced considerably, in step 9a, the microprocessor of the wheel unit 30 stores the information that the radiofrequency transmission power is incorrect and a diagnosis may be sent via radiofrequency to the wheel central control unit of the motor vehicle.

The acceleration sensor 32 then changes back to its usual detection mode, which is the one of the rotational speed of the wheel 20 in step 6 until the vehicle stops 15.

With reference more particularly to FIGS. 1 and 2, an aspect of the invention relates lastly to a wheel unit 30 for measuring operating parameters of a tire 22, said tire 22 being mounted on a rim 21, the tire 22 and the rim 21 forming a vehicle wheel 20 able to rotate about a rolling axis. The wheel unit 30 comprises a support 31 designed to be mounted on the wheel 20 and bearing a radial acceleration sensor 32 able to measure radial accelerations of the wheel 20.

The wheel unit 30 may be fastened or adhesively bonded inside the tire 22, below the tread or on the sidewalls of the tire 22, mounted on the inflation valve 23 inside the tire 22 or circled around the rim 21. The radial acceleration sensor 32 includes a device for transmitting radio waves toward the outside of the wheel unit 30.

According to an aspect of the invention, the radial acceleration sensor 32 is mounted directly or indirectly inclined within an angular range with respect to a plane tangential to the rim 21 or to the tire 22. Directly or indirectly inclined mounting has been detailed above. The unit comprises elements for comparing at least one parameter $\Delta$Gr1, $\Delta$Gr2; Ldec1, $\Delta$dec2 of the sinusoids S1 to S3 that are obtained for a wheel unit 30 in an initial mounting position on the wheel 20 and in a position at a given instant, respectively.

The wheel unit 30 also comprises elements for estimating an angle of rotation on itself of the wheel unit 30 in order to implement such a detection and estimation method. These elements may be incorporated into the microprocessor of the wheel unit 30.

According to a first embodiment of an aspect of the invention, the wheel unit 30 may comprise means for diagnosing an unacceptable modification of the transmission power of the transmission device of the wheel unit 30 when the difference between the amplitudes is not within a predetermined range of firing angles stored in the wheel unit 30.

As mentioned above, the detection and estimation method according to the second embodiment according to an aspect of the present invention, which is performed using a phase offset $\Delta$dec1, $\Delta$dec2 between the sinusoids S1 to S3, requires the use of an element external to the wheel unit 30 for an actual measurement of the angle of rotation of the wheel at the instant when a radio wave transmission takes place that is programmed to take place at an angle of rotation of the wheel called transmission angle of rotation.

The external element may be an angle coder able to measure the actual rotation of each wheel at a given instant and that forms part of a wheel anti-lock system. The wheel anti-lock system comprises means for transmitting the measurements of the actual rotation of each wheel to the wheel central control unit.

In parallel, the transmission device of the wheel unit 30 of each wheel 20 transmits radio waves to the wheel central control unit at the transmission angle of rotation of the wheel 20 that is stored in the wheel central control unit. These two transmissions of the actual angle of rotation and of the radio frame at a predetermined angle of transmission are synchronized so as to take place at the same instant.

The wheel central control unit has elements for comparing the measurement of actual rotation of each wheel at the instant of transmission detected by the angle coder and the stored transmission angle of rotation. The wheel central control unit has means for diagnosing that the difference between measurement of actual rotation at the instant of transmission and stored transmission angle of rotation is not within a predetermined range of firing angles stored in the wheel central control unit.

The invention claimed is:

1. A method for detecting and estimating an angle of rotation on itself, about a mounting axis, of a wheel unit for measuring operating parameters of a tire with a radial acceleration sensor integrated into said wheel unit, the tire being mounted on a rim, forming, with the rim, a vehicle wheel able to rotate about a rolling axis, the sensor detecting a gravitational force during the rotation of the wheel forming a sinusoid as a function of time, the rotational speed of the wheel being a function of the diameter of the wheel and of the period of the sinusoid, wherein the wheel unit is mounted on the wheel with the acceleration sensor directly or indirectly inclined with respect to a plane tangential to the rim, and wherein the angle of rotation on itself of said wheel unit and therefore of said acceleration sensor at a given instant is estimated by comparing at least one parameter of the sinusoids that are obtained for the wheel unit in an initial mounting position on the wheel and in its position at this given instant, respectively.

2. The detection and estimation method as claimed in claim 1, wherein said at least one parameter of the sinusoids for estimating the angle of rotation on itself of said wheel unit is a difference in amplitude of the sinusoids or a phase offset between the sinusoids in the initial mounting position of the wheel unit and at the given instant.

3. The detection and estimation method as claimed in claim 2, wherein said at least one parameter of the sinusoids for estimating the angle of rotation on itself of said wheel unit is a difference in amplitude of the sinusoids and a phase offset between the sinusoids in the initial position and at a given instant.

4. The detection and estimation method as claimed in claim 3, wherein, when said at least one parameter is at least one difference in amplitude of the sinusoids, there is estimation of a maximum amplitude Gr at an angle of rotation φ on itself of said wheel unit as a function of a nominal maximum amplitude Grnom in the initial position, using the following formula:

$Gr=Grnom·cos(\varphi/2)$ for φ between [0 and 90°] and [180° and 270°]

$Gr=Grnom·sin(\varphi/2)$ for φ between [90 and 180°] and [270° and 360°].

5. The detection and estimation method as claimed in claim 3, wherein, when said at least one parameter is at least one phase offset of the sinusoids, the acceleration sensor transmitting radio waves toward the outside of the wheel unit at a predetermined angle of rotation of the wheel for the transmission, the actual angle of rotation of the wheel at the instant of the transmission moreover being measured, if this predetermined angle of rotation for the transmission does not correspond to the actual angle of rotation of the wheel at the instant of the transmission, there is deduced from this a rotation on itself of the wheel unit by an angle that is the difference between the predetermined angle of rotation for the transmission and the actual angle of rotation of the wheel at the instant of the transmission.

6. The detection and estimation method as claimed in claim 2, wherein, when said at least one parameter is at least one difference in amplitude of the sinusoids, there is estimation of a maximum amplitude Gr at an angle of rotation p on itself of said wheel unit as a function of a nominal maximum amplitude Grnom in the initial position, using the following formula:

$Gr=Grnom·cos(\varphi/2)$ for φ between [0 and 90°] and [180° and 270°]

$Gr=Grnom·sin(\varphi/2)$ for φ between [90 and 180°] and [270° and 360°].

7. The detection and estimation method as claimed in claim 2, wherein, when said at least one parameter is at least one phase offset of the sinusoids, the acceleration sensor transmitting radio waves toward the outside of the wheel unit at a predetermined angle of rotation of the wheel for the transmission, the actual angle of rotation of the wheel at the instant of the transmission moreover being measured, if this predetermined angle of rotation for the transmission does not correspond to the actual angle of rotation of the wheel at the instant of the transmission, there is deduced from this a rotation on itself of the wheel unit by an angle that is the difference between the predetermined angle of rotation for the transmission and the actual angle of rotation of the wheel at the instant of the transmission.

8. A method for monitoring and compensating a transmission power of radio waves from an acceleration sensor of a wheel unit, wherein there is estimation of an angle of rotation on itself of the wheel unit in accordance with a detection and estimation method as claimed in any one of the preceding claims and a range of firing angles considered to allow a transmission of radio waves with an acceptable power and, when this angle of rotation corresponds to a firing angle that is not within the predetermined range of firing angles, a diagnosis of unacceptable transmission power is transmitted.

9. The method as claimed in claim 8, wherein there is compensation of the radio wave transmission power as a function of a predetermined table that is specific for each type of wheel unit.

10. A wheel unit for measuring operating parameters of a tire, said tire being mounted on a rim, the tire and the rim forming a vehicle wheel able to rotate about a rolling axis, the wheel unit comprising a support designed to be mounted on the wheel and bearing a radial acceleration sensor able to measure radial accelerations of the wheel, the radial acceleration sensor including a device for transmitting radio waves toward the outside of the wheel unit, wherein the radial acceleration sensor is mounted directly or indirectly inclined within an angular range with respect to a plane tangential to the rim and in that the unit comprises elements for comparing at least one parameter of the sinusoids that are obtained for a wheel unit in an initial mounting position on the wheel and in a position at a given instant, respectively, and elements for estimating an angle of rotation on itself of the wheel unit in order to implement a detection and estimation method as claimed in claim 1.

11. The wheel unit as claimed in claim 10, further comprising elements for computing a difference between the amplitudes of the sinusoids in the initial position and at a given instant and means for diagnosing an unacceptable modification of the transmission power of the transmission device of the wheel unit when the difference between the amplitudes is not within a predetermined range of firing angles stored in the wheel unit.

12. An assembly of a wheel central control unit, of a wheel anti-lock system and of wheels of a motor vehicle, each wheel comprising a wheel unit as claimed in claim 11, the wheel anti-lock system comprising an angle coder able to measure the actual rotation of each wheel at a given instant and means for transmitting the measurements of the actual rotation of each wheel to the wheel central control unit, the transmission device of the wheel unit of each wheel transmitting radio waves to the wheel central control unit at a transmission angle of rotation of the wheel stored in the wheel central control unit, wherein the wheel central control unit has firstly elements for comparing the measurement of actual rotation of each wheel at the instant of transmission detected by the angle coder and the stored transmission angle of rotation, and secondly means for diagnosing when the difference between the measurement of actual rotation at the instant of transmission and the stored transmission angle of rotation is not within a predetermined range of firing angles stored in the wheel central control unit.

13. An assembly of a wheel central control unit, of a wheel anti-lock system and of wheels of a motor vehicle, each wheel comprising a wheel unit as claimed in claim 10, the wheel anti-lock system comprising an angle coder able to measure the actual rotation of each wheel at a given instant and means for transmitting the measurements of the actual rotation of each wheel to the wheel central control unit, the transmission device of the wheel unit of each wheel transmitting radio waves to the wheel central control unit at a transmission angle of rotation of the wheel stored in the wheel central control unit, wherein the wheel central control unit has firstly elements for comparing the measurement of actual rotation of each wheel at the instant of transmission detected by the angle coder and the stored transmission angle of rotation, and secondly means for diagnosing when the difference between the measurement of actual rotation at the instant of transmission and the stored transmission angle of rotation is not within a predetermined range of firing angles stored in the wheel central control unit.

* * * * *